United States Patent [19]

Lebrun et al.

[11] Patent Number: 4,848,992
[45] Date of Patent: Jul. 18, 1989

[54] GAS FILTER SYSTEM

[75] Inventors: Bernard Lebrun, Port-Marly; Alexandre Couvrat-Desvergnes, Paris, both of France

[73] Assignee: Electricite de France (Service National, Paris, France

[21] Appl. No.: 119,059

[22] Filed: Nov. 10, 1987

[30] Foreign Application Priority Data

Dec. 5, 1986 [FR] France .................................. 86 17100

[51] Int. Cl.⁴ ........................ B01D 23/16; B01D 46/30
[52] U.S. Cl. ........................................ 55/410; 55/479; 55/486; 55/516; 210/291
[58] Field of Search ............... 55/98, 350, 387–389, 55/410, 479, 486, 487, 512, 516; 210/291, 293

[56] References Cited

U.S. PATENT DOCUMENTS

| | | | |
|---|---|---|---|
| 429,688 | 6/1890 | Hyatt | 210/291 |
| 476,737 | 6/1892 | Deutsch | 210/291 X |
| 2,364,775 | 12/1944 | Brice | 210/291 X |
| 2,620,892 | 12/1952 | Stover | 55/387 X |
| 2,678,108 | 5/1954 | Reid | 55/350 |
| 3,246,453 | 4/1966 | Becker | 55/388 X |
| 3,247,971 | 4/1966 | Kastler | 210/291 |
| 3,424,674 | 1/1969 | Webber | 55/512 X |
| 3,479,146 | 11/1969 | Hochman et al. | 55/387 X |
| 3,598,539 | 8/1971 | Pizzato | 55/389 X |
| 4,012,210 | 3/1977 | Morris | 55/487 X |
| 4,075,102 | 2/1978 | Ferrin | 210/291 X |
| 4,094,790 | 6/1978 | Schmidt, Jr. | 210/291 X |
| 4,116,840 | 9/1978 | Butterworth | 210/291 X |
| 4,161,963 | 7/1979 | Stevens | 210/291 X |
| 4,290,785 | 9/1981 | Alldredge | 55/98 X |
| 4,338,104 | 7/1982 | Merry | 55/479 X |
| 4,353,716 | 10/1982 | Rohde | 55/389 X |
| 4,379,750 | 4/1983 | Tiggelbeck | 55/387 X |
| 4,439,214 | 3/1984 | Wiebke et al. | 55/387 X |
| 4,533,475 | 8/1985 | Chiarito | 55/98 X |
| 4,713,100 | 12/1987 | Haruna et al. | 55/387 |

FOREIGN PATENT DOCUMENTS

| | | | |
|---|---|---|---|
| 125179 | 9/1979 | Japan | 55/387 |
| 178018 | 8/1986 | Japan | 55/387 |
| 1079272 | 3/1984 | U.S.S.R. | 55/387 |

OTHER PUBLICATIONS

A. l'Homme et al., AIEA, Oct. 28–Nov. 1, 1985, Columbus, Ohio, International Symposium on the Assessment of Source-Term Under Accidental Conditions, "Assessment of Release of Fission Products From the Containment of a Pressurized Water Reactor During Severe Accidental Sequences".

Primary Examiner—Robert Spitzer
Attorney, Agent, or Firm—Blakely, Sokoloff, Taylor & Zafman

[57] ABSTRACT

A gas filter system, suitable for use in a safety installation for nuclear reactor confinement vessels, comprises a generally cylindrical enclosure having a closed bottom. In an upper part of the enclosure is an inlet for the gas to be filtered. There is an outlet for the filtered gas at the side of a lower part of the enclosure. The gas passes at a low speed through a horizontal filter bed of predetermined thickness consisting of a layer of a granular filter medium. The filter medium is supported by a supporting layer of a lightweight granular material which has an average particle size greater than that of the filter medium. This layer extends down to the closed bottom of the enclosure. The filtered gas is recovered and conveyed to the outlet by a plurality of tubular members which have walls through which the gas can pass and which are placed in the supporting layer. These tubular members discharge into an annular manifold on the outside periphery of which is the outlet for the filtered gas.

15 Claims, 4 Drawing Sheets

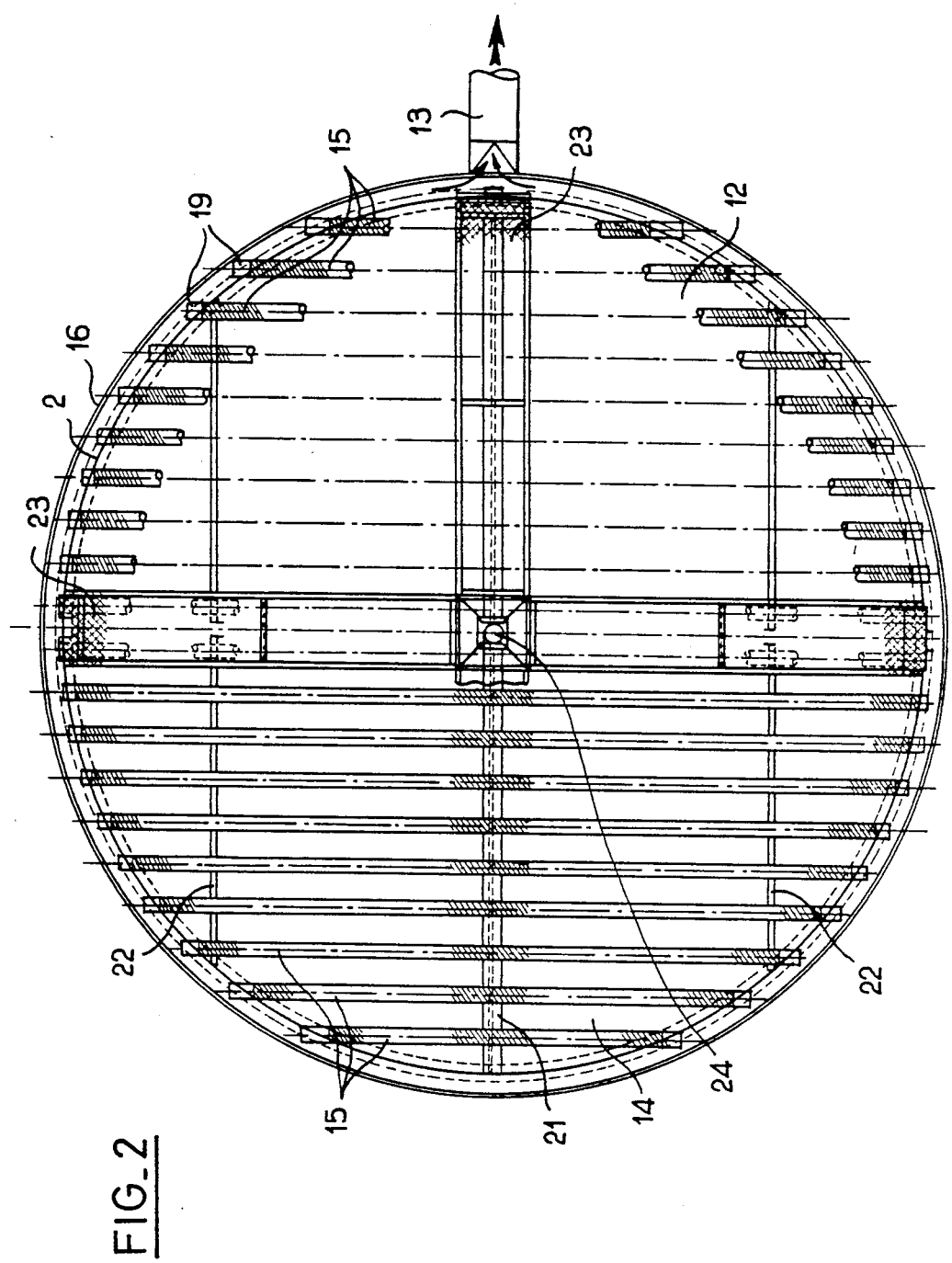

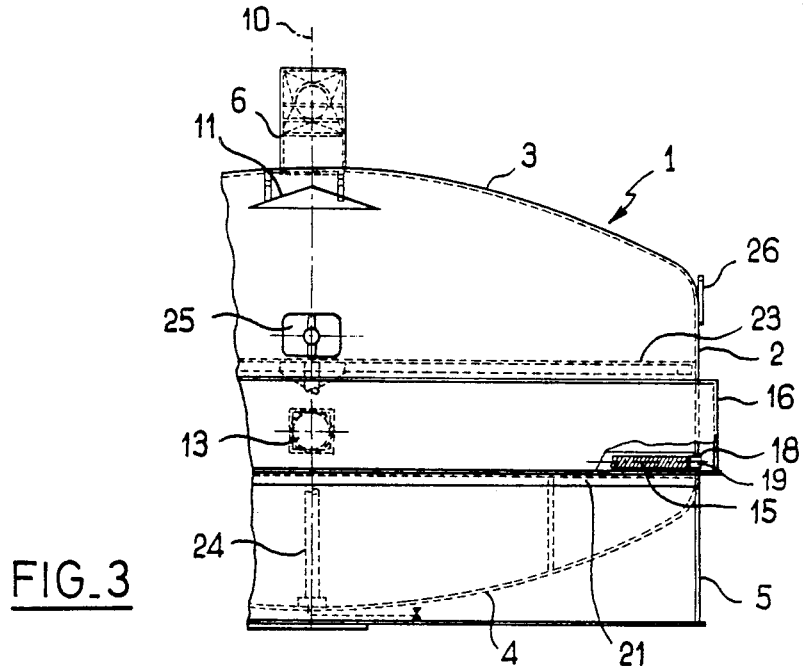
FIG_3
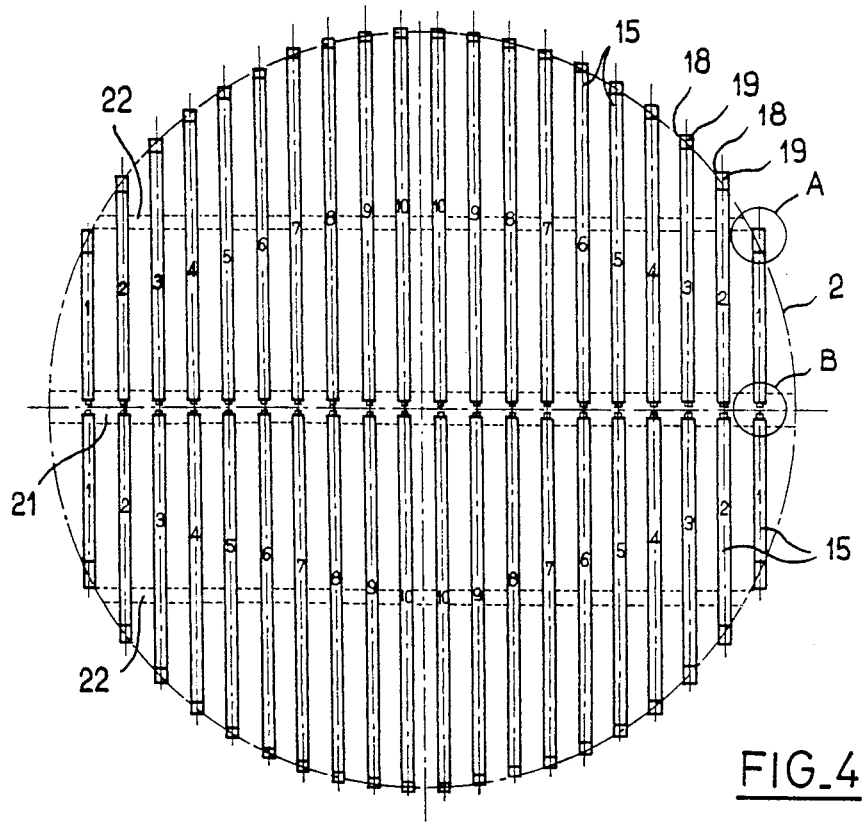
FIG_4

GAS FILTER SYSTEM

BACKGROUND OF THE INVENTION

1. Field of the Invention

The present invention concerns filtering and more particularly filtering large mass flowrates of gaseous fluids passing at low speed through a layer of filter medium.

2. Description of the Prior Art

It is well known that the effectiveness of filtration depends principally on the nature and on the particle size of the filter medium employed and on the thickness of the horizontal or otherwise bed formed by the layer of filter medium.

The problem of maintaining this thickness with time becomes crucial in certain applications where it is a question of filtering a gas laden with particles before it is vented to the atmosphere. Any reduction in this thickness may result in a loss of filtration effectiveness and an unfavorable change in the characteristics of the filter employed, which represents a non-negligible hazard to the immediate environment of the filter system.

This is especially so in the case of safety installations equipping pressurized water type nuclear reactors. Although the probability of a serious accident is extremely low, an attempt is made to avoid any irreversible deleterious effect on the confinement function that could result from any excessive internal pressure rise: it thus appears necessary to provide installations connected to the reactor confinement vessel for the purpose of expanding and then filtering the gases given off in order to eliminate any risk of destruction of the confinement vessel.

It must be borne in mind that operating conditions in applications such as these are particularly severe. The gas mixture to be filtered in the event of an accident (comprising air, carbon dioxide, water vapor, carbon monoxide and aerosols) leaves the vessel at a temperature of 140° C., at an absolute pressure of 5 bars and with a mass flowrate of as much as 3.5 kg/s. The gas mixture reaching the filter system with this high flowrate is first expanded (to an absolute pressure of 1.1 bars) and then filtered by a filter medium, the mixture having a high speed on the input and output sides of the layer of filter medium but passing through the filter bed at a low speed.

There have been numerous laboratory experiments to evaluate such situations on a reduced scale.

One particularly interesting laboratory experiment is reported in a publication from an international symposium held at the end of October 1985 at Columbus, Ohio in the United States.

As part of the PITEAS Research and Development program, a sand filter was developed in the laboratory and used in numerous experiments in which the characteristics of the gas to be filtered were varied.

By taking samples on the input and output sides of the filter system, these experiments made it possible to demonstrate the effectiveness in the laboratory of a sand filter medium having an average particle size (in the order of 0.7 mm) and a depth (approximately 800 mm) appropriate to the required characteristics.

The filter system used comprised a cylindrical glass enclosure with a diameter of approximately 1 m with an inlet tube at the top and an outlet tube at the bottom, these vertical tubes being coaxial with the main body of the enclosure. The enclosure contained a layer of fine sand constituting a horizontal bed with a depth of 800 mm. It was, of course, necessary to provide means for supporting the filter medium and means for collecting the filtered gas and conveying it to the outlet.

By way of supporting means there were placed under the layer of sand, in succession:
- a 50 mm deep "support" layer of sand with an average particle size significantly greater than that of the filter medium (approximately 2 mm),
- a metal mesh having a mesh size smaller than the average particle size of the sand in the support layer,
- a galvanized steel grating supported mechanically by means of commercially available rolled sections.

By way of recovery means there was provided a free space in the bottom part of the enclosure, between the grating and the bottom wall from which the filtered gas outlet ran.

Attempting to extrapolate from this design of sand filter to a full scale filter system would encounter numerous disadvantages.

First of all, the presence of the supporting sand layer would complicate the operations involved in charging the filter, because guaranteeing a constant thickness of the filter medium would naturally imply guaranteeing a constant thickness of the support layer. Also, it would be impossible to check this thickness after charging the filter medium (the thickness of the support layer could only be verified locally). This is a first major disadvantage, since it is not possible to do without this support layer of precise thickness.

Then, the necessity for the free space at the bottom to recover the filtered gas would entail a non-negligible risk of the filter medium support system collapsing. This hypothesis cannot be eliminated in that it is impossible to be certain that the metal parts of the support structure will not eventually become corroded, due to phenomena of condensation or chemical interaction with the filter medium. Although such corrosion is highly improbable, it has to be allowed for; it entails the risk that the support structure for the filter medium will collapse in the medium- or long-term, resulting in the filter being ruined.

Consideration might be given to filling this free space at the bottom with sand to eliminate the risk of collapse, but this would have undesirable consequences in relation to the recovery of the gas (head loss, insufficient increase in speed at the outlet), the weight of the construction (an additional 70 tons, approximately) and, of course, cost (the cost of the sand itself, and of the necessarily strengthened mechanical support means).

Consideration might be given to adopting and adapting techniques used in water filters, as some such filters incorporate a granular material filter medium comparable with the sand used here.

However, these always include a solid supporting floor with a free space at the bottom, whether they are contraflow filters (with successive layers on a floor comprising a coarse gravel support layer, a coarse filter gravel layer and a double fine filter layer of sand) or simple water reflow washing filters such as Wheeler filters (which have a concrete floor in which are pyramid-shaped cells filled in with porcelain balls over which are laid successive layers with progressively reducing particle size to finish with a layer of fine sand). Thus these techniques do not provide any teaching directed towards elimination of the risk of the filter medium support structure collapsing. Moreover, adopting such filters for the target application would entail using a very high operating pressure in order to obtain a high speed at the outlet from the filter medium, and thus an enormous structure to accommodate such conditions.

An object of the present invention is to propose a filter system designed to overcome the aforementioned disadvantages through the use of a simple, relatively economical and reliable structure, especially with regard to the risk of collapse of the filter medium support structure.

Another object of the invention is to propose a filter system which makes it possible to obtain a high ratio between the speed of the gas in the recovery device and its speed in the filter medium, by which is meant a ratio of as high as 100:1 or more, for example.

SUMMARY OF THE INVENTION

The present invention consists in a gas filter system comprising a generally cylindrical enclosure having a closed bottom, an inlet for gas to be filtered in an upper part of the enclosure, an outlet for filtered gas at the side of a lower part of the enclosure, a horizontal filter bed of predetermined thickness comprising a layer of a granular filter medium through which the gas to be filtered passes at a low speed, filter medium support means comprising a supporting layer of a lightweight granular material having an average particle size greater than that of the filter medium and extending down to the closed bottom of the enclosure, and means for recovering filtered gas and conveying it to the outlet comprising a plurality of tubular members having walls through which the gas can pass disposed in the supporting layer and an annular manifold into which the tubular members discharge and on the outside periphery of which is the outlet.

A flexible mesh member is preferably disposed between the filter bed and the supporting layer and has a mesh size less than the average particle size of the filter medium in order to avoid segregation of the filter medium in the supporting layer and to guarantee that the predetermined thickness of the horizontal filter bed is maintained; in one embodiment the flexible mesh member is a woven fabric, of glass fibers, for example.

The lightweight granular material constituting the supporting layer is advantageously an expanded material with a large average particle size, such as expanded clay.

The tubular members disposed in the supporting layer preferably all lie in substantially the same horizontal plane. The tubular members disposed in the supporting layer are advantageously screens all disposed in substantially the same direction; in one embodiment each of the screens has a smooth free end and the enclosure has a respective opening in its side wall adapted to receive each such smooth free end.

To avoid any risk of penetration by the filter medium, the screens advantageously have walls in which there are holes or slots smaller than the average particle size of the filter medium.

To facilitate the use of large dimensions, the screens advantageously constitute half-screens which each extend away from one side of a common diameter of the enclosure on which is disposed a cross-beam to which the ends of the half-screens are fixed.

The annular manifold into which the tubular members discharge is preferably a torus of substantially constant rectangular cross-section; in one embodiment the lateral wall of the enclosure comprises holes through which pass free ends of the tubular members and the annular manifold carrying the side outlet is fixed to this lateral wall of the enclosure in such a way as to cover these holes, which are preferably regularly distributed along the periphery of this wall.

The filter system advantageously comprises a transverse catwalk inside the enclosure at a level corresponding to the surface of the filter medium when the filter bed has its predetermined thickness: this makes it possible to walk over the filter medium layer and to verify the level of this layer; in one embodiment the catwalk is of cruciform shape, on two diameters of the enclosure, and the lateral wall of the enclosure comprises at least one manhole providing access to the catwalk.

The filter medium is preferably sand having an average particle size substantially equal to 0.7 mm and the lightweight material constituting the supporting layer is preferably expanded clay having an average particle size between 10 and 25 mm; in one embodiment the tubular members are in an upper part of the supporting layer and comprise parallel screens in the walls of which are holes or slots approximately 0.4 mm wide.

Other characteristics and advantages of the invention will emerge more clearly from the following description of a specific embodiment given with reference to the appended drawings.

BRIEF DESCRIPTION OF THE DRAWINGS

FIG. 2 is a cross-section on the line II—II in FIG. 1.

FIG. 3 is a side view in elevation of the filter system from FIG. 1, cut away to show the end of a screen discharging into the annular manifold.

FIG. 4 shows a transverse cross-section similar to that of FIG. 2 indicating how the tubular members are arranged as half-screens.

DESCRIPTION OF THE PREFERRED EMBODIMENT

Figure 1:
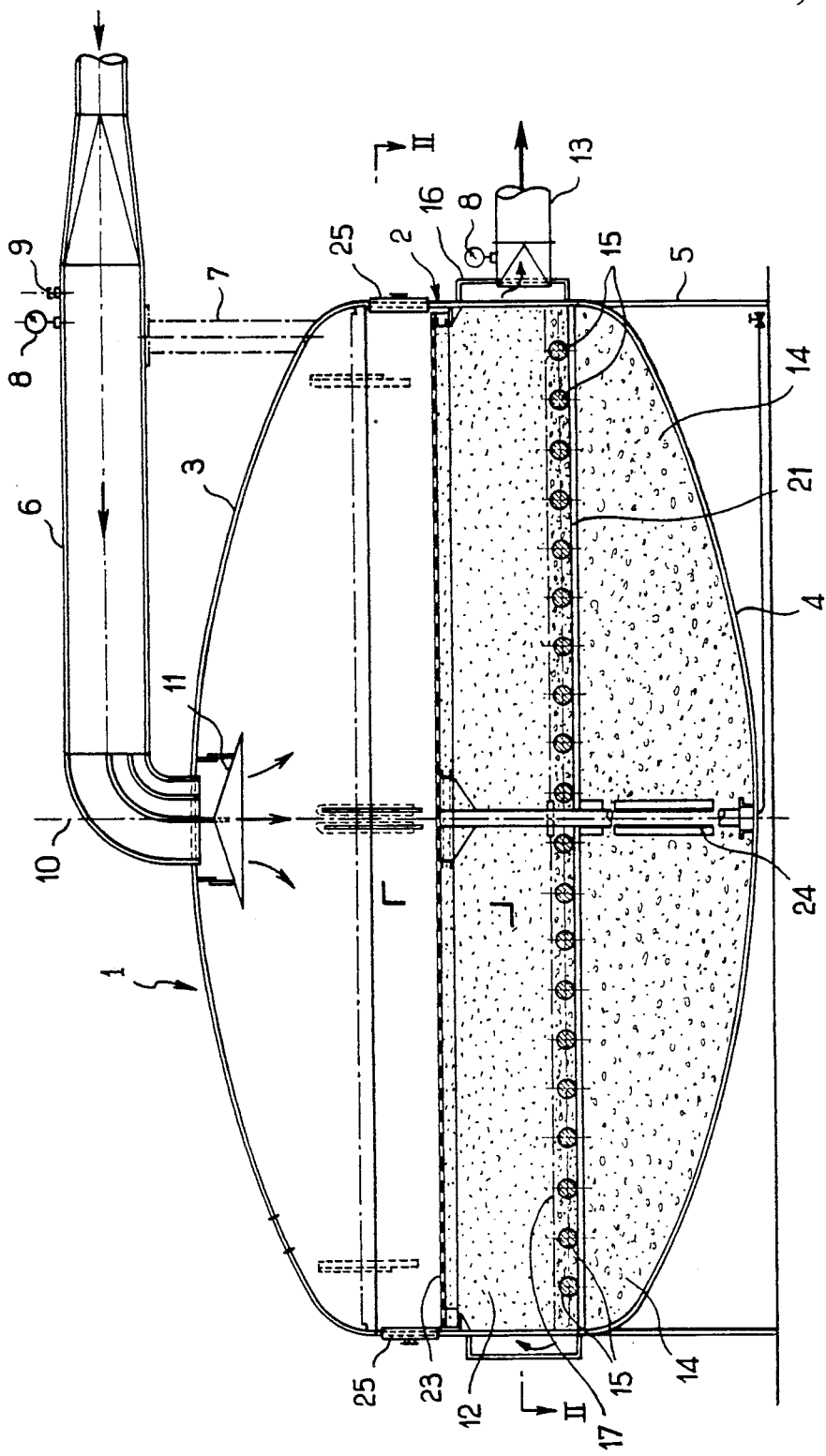
FIG. 1 shows a filter system in accordance with the invention in axial cross-section.

The gas filter system 1 shown in FIGS. 1 and 2 comprises a generally cylindrical enclosure 2 with a top 3 and a bottom 4, both of which are domed, the latter being surrounded by a cylindrical skirt 5. An inlet pipe 6 is provided in the upper part of the enclosure 2 for feeding in the gas to be filtered. This pipe 6, supported by a bracket 7 fixed to the top of the enclosure, comprises a pressure gauge 8 and a test outlet 9; it discharges at the level of the axis 10 of the enclosure, above a diffuser cone 11.

In the framework of the envisaged preferred application, the gas arriving in the pipe 6 has been previously expanded on the inlet side of the filter system, by means of a diaphragm orifice (not shown), so as to reduce its pressure from 5 bars absolute to 1.1 bars absolute. It should be noted that the filter system in accordance with the invention is designed to function with a one-way flow of the gas, in the downward direction. Filtering has to be achievable with a high mass flowrate of the gas with a high speed on the input and output sides of the filter medium used (in the order of 40 m/s for example), the gas passing through the filter medium at a low speed (preferably around 0.1 m/s). The fluid to be filtered is fed to the filter at high speed primarily to reduce the cross-section of the pipework, which has important consequences in connection with the weight and cost of the installation, and also to force out any condensate if the gas is laden with vapor.

In this way there is defined a layer of granular material filter medium 12 through which the gas to be filtered passes at low speed, said layer constituting a horizontal bed of predetermined thickness. The filter medium employed may be sand with an average particle size of around 0.7 mm or any other material suitable for the type of application envisaged, in the form of small glass balls, for example. It must be realized that the requirement for the gas to pass through the filter medium at a low speed when the pressure is 1.1 bars absolute implies a large cross-section; to give an example, a speed of 0.1 m/s would lead to the choice of a filter cross-section in the order of 42 $m^2$ for the flowrate considered. Given these conditions, it is easy to imagine the size of the structure providing the filter medium support means and the means for recovering the filtered gas and feeding it to the outlet from the filter enclosure.

Thus the filter enclosure 2 has a closed bottom 4 and a side outlet 13, so differing from the structure of the enclosure used in connection with the laboratory experiments as described hereinabove.

According to one essential aspect of the invention, the support means for the filter medium layer 12 essentially comprise a supporting layer 14 of a lightweight material having an average particle size larger than that of the filter medium 12, said supporting layer extending down to the bottom 4 of the filter enclosure 2. The lightweight material used will evidently depend on the type of application concerned. This choice will be conditioned by the mechanical characteristics needed to support the load imposed by the filter medium and the dynamic pressure at the temperature in question and possibly the need for chemical properties conferring on it some degree of inertness. Use may be made, for example, of expanded clay with an average particle size preferably between 10 and 25 mm, which makes it possible to limit the head losses when the gas passes through this supporting layer and also to limit the weight of this layer for a given volume. To give an example, using sand with an average particle size of 0.7 mm for the filter medium and expanded clay of the aforementioned type for the supporting layer, there is obtained a ratio of nearly 6:1 between the densities of these two constituents, which represents a very significant saving in weight.

Thus unlike prior art techniques, there is no free space beneath the filter medium, since this space is entirely filled with the lightweight material supporting layer 14. This characteristic eliminates the risk of the supporting means collapsing, so that the thickness of the filter medium bed 12 is guaranteed to be stable with time.

In combination with the characteristics of the invention relating to the supporting means, another essential characteristic relates to the means for recovering the filtered gas. These essentially comprise a plurality of tubular members 15 through the walls of which the gas can pass, these tubular members being disposed in the lightweight material supporting layer 14, and an annular manifold 16 into which said tubular members discharge and on the outside periphery of which is provided the side outlet 13 from the filter enclosure. These recovery means, embedded in the supporting layer 14, enable the gas to exit at high speed with a homogeneous distribution of the filtered gas. By disposing the tubular members 15 in the upper part of the supporting layer 14 head losses are limited whilst enabling slight acceleration of the gas in the supporting layer, whereas high acceleration takes place within the tubular members themselves and then in the annular manifold.

There is advantageously provided between the filter medium layer 12 and the supporting layer 14 a flexible mesh member 17 which makes it possible to avoid segregation of said filter medium in the supporting layer and to guarantee that the predetermined thickness of the horizontal bed is maintained. This flexible mesh member 17 may be made in the form of a woven tissue, from glass fibers, for example, or from a material that is marketed under the trademark KEVLAR, with a mesh size chosen to be less than the average particle size of the filter medium. Using sand with an average particle size of 0.7 mm, good results are obtained by choosing a mesh size in the order of 0.2 mm for the flexible fabric 17, as this size of mesh is smaller than the smallest particle that may be included in the filter medium. Moreover, this fabric will provide good resistance to the dynamic loads arising during operation of the filter system.

By comparison with the structure of the laboratory filter system constructed as part of the PITEAS program previously mentioned, note that the supporting sand layer which has a particle size in the order of 2 mm and a depth of 50 mm, this latter dimension having to be obtained with a high degree of accuracy, has been eliminated. Also, the combination of lightweight granular material plus flexible fabric plus tubular members is an advantageous replacement for the laboratory developed arrangement using a metal screen, a galvanized steel grating and a space at the bottom for recovering the gas: the mass of the support structure can be reduced by approximately 12 tons using a domed bottom and expanded clay with a density of 300 kg/$m^3$, with no risk of the filter medium support structure collapsing.

FIGS. 2 through 4 give a better idea of the spatial arrangement of the tubular members 15 in the filter system in accordance with the invention. It is necessary to achieve homogeneous distribution of the gas and progressive acceleration of the gas as its passes from the supporting layer into the tubular members and finally into the annular manifold. In this instance the tubular members are screens 15 lying in substantially the same horizontal plane and preferably in the same direction. Such screens are conventionally used to provide physical separation between a solid substance and a fluid to be recovered and are used, for example, in many activities where it is necessary to hold back a solid and to recover a fluid (petrochemicals, water treatment, demineralizing plant, water filters). The total surface area of the apertures of the screen depends on the fluid flowrate required and the aperture or mesh of the screen must be less than the particle size of the solid. In this instance, cylindrical screens could be used with holes or slots in the walls in order to obtain passages through them smaller than the average particle size of the filter medium. To give an example, stainless steel screens may be used with 0.4 mm wide slots, the number of such screens being chosen such that the homogeneity of the range of speeds in the bed of sand is not disturbed. Thus by installing 20 screens of varying length with a diameter of 100 mm a surface area of 7.5 m² is obtained. A cylindrical tubular recovery member with holes or slots could be used, or recovery members obtained by winding a spiral onto a matrix formed of parallel rods.

In this way the gas enters the top part of the enclosure at a speed in the order of 42 m/s, for example, passes through the filter medium bed at a speed in the order of 0.1 m/s, and is recovered, after passing through the supporting layer as far as the inlets of the screens, at a speed in the order of 0.5 m/s; the gas from the screens then undergoes a high acceleration (to give an example, the speed at which the gas is recovered may be in the order of 12.8 m/s at the outlet from the largest screen), this acceleration continuing within the annular manifold 16 into which the peripheral ends of all the screens 15 discharge, yielding a speed of 40 m/s at the side outlet 13.

The annular manifold 16 into which the tubular members or screens discharge is preferably a torus of substantially constant rectangular cross-section, the final increase in speed being obtained by means of a convergent section at the side outlet 13. The annular manifold carrying the side outlet 13 is fixed to the side wall of the filter enclosure 2 in such a way as to cover a plurality of holes 18 formed in said wall for the free ends of the screens 15 to pass through; these holes 18 are preferably distributed regularly along the periphery of the wall of the enclosure.

Figure 5:
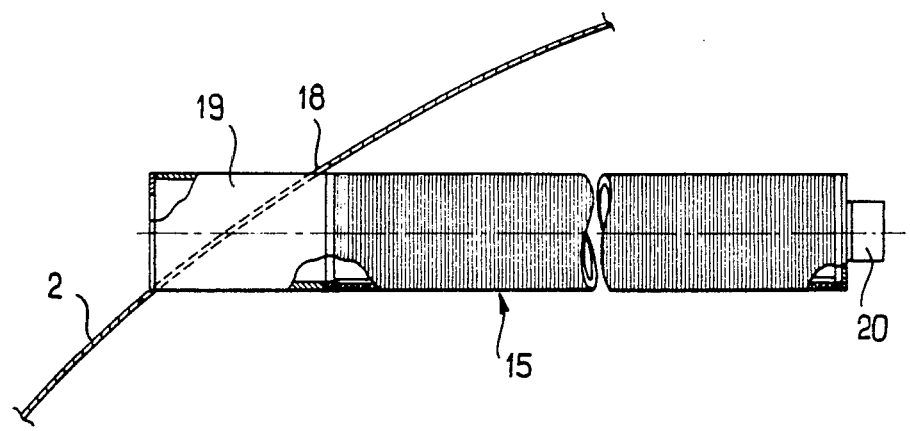
FIG. 5 is a view in cross-section to a larger scale showing the detail A from FIG. 4.
Figure 6A:
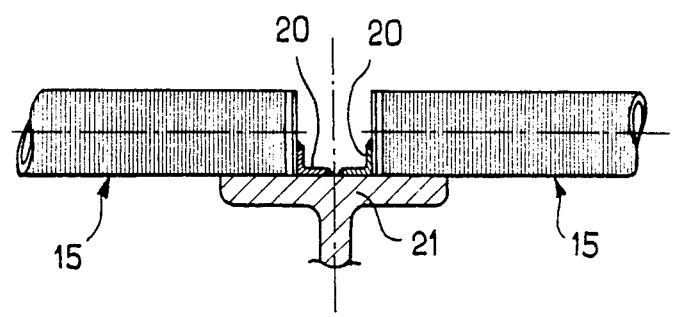
FIGS. 6a and 6b show the detail B from FIG. 4, respectively in vertical cross-section and in plan view.
Figure 6B:
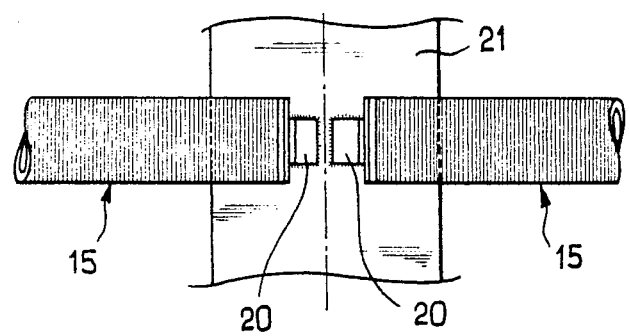

FIG. 5 shows one detail of an embodiment in which the ends of the screens 15 at the periphery of the filter enclosure are in the form of a smooth sleeve 19, welded to the body of the screen proper, for example. The sleeve 19 enables some degree of sliding within the associated hole 18 in the wall of the enclosure 2, which confers some degree of flexibility on the system with regard to thermal expansion. Independently of this problem of thermal expansion, a fluid-tight joint at this point would be of no benefit, given that the gas reaching the ends of the screens has already been filtered. There can also be seen at the other ends of the screens a welded fixing bracket 20. Given the large size of the system, it is advantageous for the screens 15 to extend away from a common diameter of the filter enclosure, on which the ends of the half-screens formed in this way are fixed to a common diametral cross-beam 21. FIGS. 6a and 6b show in more detail the fixing of the set of half-screens, for example by welding their brackets 20 to the common diametral cross-beam 21. Excellent gas recovery conditions are also obtained because the fluid entering the screens is immediately propagated away from the common diametral cross-beam towards the annular manifold. The mechanical supporting of the set of screens may naturally be reinforced by providing other, non-diametral cross-beams 22, as shown in FIGS. 2 and 4.

It is advantageous to provide also a transverse catwalk 23 within the filter enclosure, disposed at a level corresponding to the predetermined level of the upper surface of the filter medium layer 12. This catwalk, which is advantageously of cruciform shape lying on two diameters of the enclosure, makes it possible for personnel to enter the enclosure without walking on the filter medium and to verify the level of the filter medium. It is naturally necessary to use a sufficiently rigid grating that interferes as little as possible with the passage of the gas. A lightweight but rigid structure is obtained by connecting the diametral cross-beam 21 and the cruciform catwalk 23 to a central tubular structure 24 preferably fixed at the lower end to the bottom 4 of the enclosure, as shown in FIG. 1.

Finally, FIGS. 1 and 3 show two manhole covers 25, in the form of autoclave doors, providing access for personnel to the cruciform catwalk 23. The members 26 (FIG. 3) are lifting lugs, in this case fixed to the periphery of the top 3, in order to facilitate handling operations.

The filter system in accordance with the invention thus has numerous advantages, firstly where safety is concerned given that the service life of the support structure is considerable, eliminating any risk of collapse leading to loss of filter medium depth, and thus of the decontamination factor in the type of application considered. There are further advantages, of course, with regard to the weight of the whole and the cost of constructing it. Finally, performance is high and in particular there is a high ratio between the speed of the gas at the outlet from the tubular screens and its speed within the filter medium (a ratio of 100:1 can easily be achieved).

It goes without saying that the invention is not in any way limited to the embodiments that have been described, but to the contrary encompasses any variant thereof using equivalent means within the scope of the claims.

We claim:

1. Gas filter system comprising a generally cylindrical enclosure having a closed bottom, an inlet for gas to be filtered in an upper part of said enclosure, an outlet for filtered gas at the side of a lower part of said enclosure, a horizontal filter bed of predetermined thickness comprising a layer of a granular filter medium through which said gas to be filtered passes at a low speed, filter medium support means comprising a supporting layer of a lightweight granular material having an average particle size greater than that of said filter medium and extending down to said closed bottom of said enclosure, and means for recovering filtered gas and conveying it to said outlet comprising a plurality of tubular members having walls through which said gas can pass disposed in said supporting layer and an annular manifold into which said tubular members discharge and on the outside periphery of which is said outlet;

wherein a flexible mesh member is disposed between said filter bed and said supporting layer and has a mesh size less than the average particle size of said filter medium in order to avoid segregation of said filter medium in said supporting layer and to guarantee that said predetermined thickness of said horizontal filter bed is maintained.

2. System according to claim 1, wherein said flexible mesh member is a woven fabric.

3. System according to claim 2, wherein said woven fabric is woven from glass fibers.

4. System according to claim 1, wherein said lightweight granular material constituting said supporting layer is an expanded material with a large average particle size.

5. System according to claim 4, wherein said expanded granular material is expanded clay.

6. System, according to claim 1, wherein said tubular members disposed in said supporting layer are screens all disposed in substantially the same direction.

7. System according to claim 6, wherein each of said screens has a smooth free end and said enclosure has a respective opening in its side wall adapted to receive said smooth free end.

8. System according to claim 7, wherein said annular manifold into which said tubular members discharge is a torus of substantially constant rectangular cross-section and wherein the lateral wall of said enclosure comprises holes through which pass free ends of said tubular members and said annular manifold carrying said side outlet is fixed to said lateral wall of said enclosure in such a way as to cover said holes.

9. System according to claim 8, wherein said holes are regularly distributed along the periphery of said wall.

10. System according to claim 6, wherein said screens have walls in which there are holes or slots smaller than the average particle size of said filter medium.

11. System according to claim 1, further comprising a transverse catwalk inside said enclosure at a level corresponding to the surface of said filter medium when said filter bed has said predetermined thickness.

12. System according to claim 11, wherein said catwalk is of cruciform shape, on two diameters of said enclosure, and said lateral wall of said enclosure comprises at least one manhole providing access to said catwalk.

13. System according to claim 1, wherein said filter medium is sand having an average particle size substantially equal to 0.7 mm and said lightweight material constituting said supporting layer is expanded clay having an average particle size between 10 and 25 mm.

14. System according to claim 13, wherein said tubular members are in an upper part of said supporting layer and comprises parallel screens in the walls of which are holes or slots approximately 0.4 mm wide.

15. Gas filter system comprising a generally cylindrical enclosure having a closed bottom, an inlet for gas to be filtered in an upper part of said enclosure, an outlet for filtered gas at the side of a lower part of said enclosure, a horizontal filter bed of predetermined thickness comprising a layer of a granular filter medium through which said gas to be filtered passes at a low speed, filter medium support means comprising a supporting layer of a lightweight granular material having an average particle size greater than that of said filter medium and extending down to said closed bottom of said enclosure, and means for recovering filtered gas and conveying it to said outlet comprising a plurality of tubular members having walls through which said as can pass disposed in said supporting layer and an annular manifold into which said tubular members discharge and on the outside periphery of which is said outlet;
 wherein said tubular members are screens disposed in said supporting layer all lie in substantially the same horizontal plane; and
 wherein said screens constitute half-screens which each extend away from one side of a common diameter of said enclosure on which is disposed a cross-beam to which the ends of said half-screens are fixed.

* * * * *

UNITED STATES PATENT AND TRADEMARK OFFICE
CERTIFICATE OF CORRECTION

PATENT NO. : 4,848,992
DATED : 07/18/89
INVENTOR(S) : Lebrun et al.

It is certified that error appears in the above—identified patent and that said Letters Patent is hereby corrected as shown below:

| COLUMN | LINE | |
|---|---|---|
| 10 | 03 | delete "comprises" insert --comprise-- |
| 10 | 18 | delete "as" insert --gas-- |

Signed and Sealed this

Eighteenth Day of September, 1990

Attest:

HARRY F. MANBECK, JR.

*Attesting Officer*    *Commissioner of Patents and Trademarks*